United States Patent
Tsai et al.

(10) Patent No.: US 8,553,209 B2
(45) Date of Patent: Oct. 8, 2013

(54) THREE-DIMENSIONAL OPTICAL COHERENCE TOMOGRAPHY CONFOCAL IMAGING APPARATUS

(75) Inventors: Chien-Chung Tsai, Taipei (TW); Kuang-Yu Hsu, Taipei (TW); Yen-Sheng Lin, Taipei (TW); Sheng-Lung Huang, Taipei (TW)

(73) Assignee: National Taiwan University, Taipei (TW)

( * ) Notice: Subject to any disclaimer, the term of this patent is extended or adjusted under 35 U.S.C. 154(b) by 417 days.

(21) Appl. No.: 12/912,018

(22) Filed: Oct. 26, 2010

(65) Prior Publication Data

US 2011/0310395 A1 Dec. 22, 2011

(30) Foreign Application Priority Data

Jun. 18, 2010 (TW) .............................. 99120029 A

(51) Int. Cl.
*G01N 21/00* (2006.01)
*G01B 11/02* (2006.01)

(52) U.S. Cl.
USPC ............................................. 356/73; 356/497

(58) Field of Classification Search
USPC ........................................ 356/479, 497, 73
See application file for complete search history.

(56) References Cited

U.S. PATENT DOCUMENTS

| | | | |
|---|---|---|---|
| 5,804,813 A | 9/1998 | Wang et al. | |
| 6,522,794 B1 * | 2/2003 | Bischel et al. | 385/4 |
| 6,570,704 B2 * | 5/2003 | Palese | 359/349 |
| 6,713,742 B2 | 3/2004 | Mandella et al. | |
| 7,649,629 B2 * | 1/2010 | Rogers et al. | 356/479 |
| 7,902,525 B2 * | 3/2011 | Akselrod et al. | 250/459.1 |
| 7,973,940 B2 * | 7/2011 | Kobayashi et al. | 356/497 |
| 7,990,541 B2 * | 8/2011 | Izatt et al. | 356/497 |
| 2007/0236699 A1 * | 10/2007 | Chou et al. | 356/489 |
| 2009/0310083 A1 | 12/2009 | Campbell et al. | |
| 2011/0157597 A1 * | 6/2011 | Lu et al. | 356/479 |

FOREIGN PATENT DOCUMENTS

| | | |
|---|---|---|
| JP | 2007086428 | 5/2007 |
| TW | 200619673 | 12/1993 |
| TW | 200937005 | 2/1997 |
| TW | 569008 | 1/2004 |
| TW | 200426397 | 12/2004 |

* cited by examiner

*Primary Examiner* — Michael A Lyons
*Assistant Examiner* — Shawn Decenzo
(74) *Attorney, Agent, or Firm* — WPAT, P.C.; Anthony King

(57) ABSTRACT

A 3D OCT confocal imaging apparatus includes a light source module for providing an illumination beam with wider bandwidth from a crystal fiber; a reference source module; a pickup module; a beam splitter; an optical filter; and a sensor module. When the illumination beam illuminates a sample, a pickup objective lens and a piezoelectric actuator of the pickup module together provide an image beam scanning the sample in depth direction. The image beam and a reference beam from the reference source module together form an interference image beam, which is converted by a photosensor into a coherence image electric signal. Meanwhile, the interference image beam passes through a pinhole to form a confocal image, which is converted by an excited light photometer into a confocal image electric signal. With an image processing system, a 3D OCT confocal microscopic image of the sample can be produced from these image electric signals.

5 Claims, 5 Drawing Sheets

THREE-DIMENSIONAL OPTICAL COHERENCE TOMOGRAPHY CONFOCAL IMAGING APPARATUS

FIELD OF THE INVENTION

The present invention relates to a three-dimensional optical coherence tomography (3D OCT) confocal imaging apparatus, and more particularly to a 3D microscope for forming optical coherence tomography images and confocal microscopic images.

BACKGROUND OF THE INVENTION

In early stage, microscopic technology is realized mainly by electron microscope and optical microscope. An optical microscope uses optical lenses to magnify images of a sample to reach a resolution up to 200 nm. On the other hand, an electron microscope utilizes the short wavelength characteristic of electrons to observe micro crystal structure or biological cellular structure. In the case of a transmission electron microscope, a resolution up to 0.1 nm can be reached. However, the transmission electron microscope would disadvantageously cause chemical changes in the sample; and electron beams illuminating the samples tend to destroy organic materials, molecular structures, DNA, etc.

A confocal microscope is developed from the optical microscopic technology. It has a light source that emits laser light, which passes lenses to focus on the sample. If the sample is located at the focal point, reflected light would pass the lenses to condense on the light source and form a confocal condition. The confocal microscope includes a dichroic mirror arranged on the optical path of the reflected light for refracting the reflected light to other directions, and a pinhole is provided on a focal point of the dichroic mirror. When the reflected light passes through the pinhole, an image can be formed on a photosensor. When the light source scans the sample, a three-dimensional (3D) image of the sample can be created. U.S. Patent Publication No. 2009/0310083 discloses an application of the confocal microscope using polarized light. Taiwan Patent Publication No. 200619673 also discloses a method of increasing the measuring resolution in depth of a confocal microscope using light interference. U.S. Pat. No. 5,804,813 discloses the use of a differential confocal microscopy, in which a He—Ne laser or a solid-state laser is used as a light source to reach a resolution in depth of 2 μm and a lateral resolution of 0.3 μm. However, the confocal microscope has a main disadvantage of uneasy to show the image quickly. When the confocal microscope is applied in the study of biofilm, collagen protein, cell movement, liquid interface or liquid-gas interface characteristics and the like, there would be considerable limitation. Moreover, the confocal microscope has a resolution in depth being limited to the size of the pinhole and accordingly has very small penetration depth, making the confocal microscope not good enough for use.

As to tomographic imaging, such as the optical coherence tomography (OCT) imaging, it can penetrate the sample to directly observe the interior of the sample. For example, the OCT imaging can penetrate deep into the bio-tissue by several millimeters and has a resolution in depth of 15-20 μm or even higher. Since the OCT imaging has high resolution power, high sensitivity, and three-axis positioning ability, it has particular potential in medical diagnosis. In addition, due to the economical system development cost thereof, the OCT imaging has gained wide attention of users. In the OCT imaging, the depth-scan thereof is achieved by adjusting a reference mirror, and the lateral-scan is achieved by moving the sample laterally or scanning by probing beam, so that backward scattering of light from the sample and the light path of light reflected from the reference mirror overlap with each other in length to form interference. In brief, the OCT imaging has an important advantage that the resolution in depth is independent of the lateral resolution, and the resolution in depth would not be sacrificed due to the increased lateral resolution. Therefore, the OCT imaging is very suitable for forming 3D images. If it is desired to have an increased resolution in depth, it is better to select a light source with a spectral bandwidth as wide as possible. For example, Taiwan Patent Publication No. 200426397 discloses the use of white light-emitting diode to excite fluorescent powder, so as to produce a bluish-purple light source having a relatively wide spectral bandwidth; Taiwan Patent Publication No. 200937005 discloses the use of ultra-wideband optic fiber laser and spectrum modulation system in cross-section analysis of the interior of a semiconductor wafer. Or, for example, U.S. Pat. No. 6,713,742 discloses the disposition of a sample at a specific angle and the use of angled-dual-axis scanning, bringing the sample to move relative to the light source in order to obtain increased resolution.

In view that the confocal microscope and the OCT imaging have their own advantages, Taiwan Patent No. 569008 discloses a real-time multiplex photoelectric sensing system that can be switched between a confocal microscope and an OCT microscope for observing the sample. National Science Council of Executive Yuan, R.O.C. discloses in its research project No. NSC94-2215-E-007-015 a full-field optical coherence microscopy (OCM), in which a high numerical aperture (NA) objective lens is used to provide an effect similar to that provided by a confocal microscope; and the heterodyne interference technique based on the Michelson interferometer is used to combine the optical configuration of the Michelson interferometer with the optical configuration of the confocal microscope. The above structures are used with a scanner mirror and a translation stage to achieve the purpose of obtaining stratified images of a sample. Japanese Patent Publication No. 2007-086428 discloses a confocal microscope system 91, which applies the OCT technique to the confocal microscope. Please refer to FIG. 5. When light L emitted from a light source 92 enters a dividing means 93, the light L is divided into two parts L1 and L2, which enter a confocal optical system 910 and a light modulator 920, respectively. The light L1 entering the confocal optical system 910 sequentially passes an optical fiber 911 and a focusing objective lens 913 to illuminate a sampling object S. The confocal optical system 910 condenses light reflected from the sampling object S to produce catoptric light L3. Meanwhile, the light L2 is adjusted by the light modulator 920 to a desired frequency to form reference light L2. The catoptric light L3 having been interfered by the reference light L2 forms an interference light L4 to pass through an interference detector 96, and an image processor 98 collects interference images of the sample S at different depths. The processed images are displayed on a screen 950. While the combination of the confocal microscope with the OCT microscope can provide images at different depths and having increased resolution, it is still difficult to get 3D images of highly improved resolution when a light source with insufficient bandwidth for lateral scanning is used.

In view of the disadvantages in the prior art, it is desirable to develop an imaging technique that combines the OCT imaging and the confocal imaging to reconstruct an integrated functional 3D image while using the same light source to form high-resolution microscopic images for further produce a high-resolution 3D microscopic image of a sample.

SUMMARY OF THE INVENTION

A primary object of the present invention is to provide a 3D OCT confocal imaging apparatus for forming images of a sample at different depths thereof. Electric signals converted from these images can be processed using an external image processing computer to produce a visualized 3D image of the sample. To achieve the above and other objects, the 3D OCT confocal imaging apparatus according to the present invention includes a light source module, a reference source module, a pickup module, a beam splitter, an optical filter, and a sensor module.

The light source module includes a pumping laser source and a broadband gain medium. The pumping laser source usually has a relatively narrower bandwidth. The broadband gain medium converts partial laser light emitted from the pumping laser source into a broadband light source. The light source module with the broadband light source and the residual laser light together form a common-path illumination beam having a relatively wider bandwidth. The broadband gain medium can be implemented using different means, such as fluorescent powder, planar waveguide, crystal bulk and crystal fiber. The illumination beam passes the beam splitter to enter the pickup module and the reference source module at the same time. The beam splitter is an optical element capable of splitting incident light into two parts, one of which is refracted into the pickup module while the other part passes through the reference source module.

The reference source module includes at least one mirror for reflecting the illumination beam that passes through the beam splitter into the reference source module and thereby forming a reference beam. The pickup module includes a pickup objective lens, a piezoelectric actuator, and a dual-axis linear stage. When the illumination beam illuminates a sample, the pickup objective lens can adjust a focal point of an image of the sample, so that the illumination beam is focused on a very small point on the sample. The piezoelectric actuator is connected to the pickup objective lens for generating oscillation in a depth direction relative to the sample. When the piezoelectric actuator is actuated, it enables depth scan for obtaining microscopic images of the sample and provides a scanning image beam. The image beam that passes through the beam splitter and the reference beam together provide an interference image beam. The interference image beam is filtered by the optical filter to remove undesired frequencies before it enters the sensor module. The dual-axis linear stage is able to move the sample laterally. When the dual-axis linear stage moves the sample to a next position, microscopy imaging can be performed at the position.

The optical filter is an optical element. Different optical filters can be provided depending on a user's requirements. Or, interference image beams of different bandwidths can be selected according to the characteristics of the sample.

The sensor module includes a photosensor, a dichroic mirror, an excited light photometer, a confocal objective lens, and a pinhole. When the interference image beam passes through the dichroic mirror, it is split by the dichroic mirror into two parts of different bandwidths, which separately enter the photosensor and the confocal objective lens. With the photosensor, the part of the split interference image beam entering thereinto is formed into a coherence image electric signal for transmitting outward. The confocal objective lens condenses the split interference image beam to pass through the pinhole to form a confocal image. The confocal image is converted by the excited light photometer into a confocal image electric signal, which is then transmitted outward. Depending on different purposes, the excited light photometer can be a fluorescence sensor, an avalanche photo diode (APD), a photomultiplier tube (PMT), or an optical spectrum analyzer (OSA) without being limited thereto.

The coherence image electric signals and the confocal image electric signals generated by the photosensor and the excited light photometer, respectively, are collected. And, the pickup module retrieves images of the sample in both lateral and depth directions. In this manner, it is possible to produce a 3D microscopic image of the sample.

Another object of the present invention is to provide a 3D OCT confocal imaging apparatus for forming images of a sample at different depths thereof. Electric signals converted from these images can be processed using an external image processing computer to produce a visualized 3D image of the sample. To achieve the above and other objects, the 3D OCT confocal imaging apparatus according to the present invention includes a light source module, a reference source module, a pickup module, a beam splitter, an optical filter, and a sensor module.

The light source module includes a pumping laser source, a focusing lens, a broadband gain medium, a collimator, and a pinhole. The pumping laser source is adapted to emit laser light when being excited, and the emitted laser light usually has a relatively narrow bandwidth. The broadband gain medium is adapted to convert the laser light into light rays of different frequencies, which and the laser light together form an illumination beam with a relatively wider bandwidth. The broadband gain medium can be implemented using different means, such as fluorescent powder, planar waveguide, crystal bulk and crystal fiber. The collimator is adapted to collimate the illumination beam to produce a collimated illumination beam, which passes through the pinhole to produce a confocal illumination beam. The confocal illumination beam passes the beam splitter to enter the pickup module and the reference source module.

The reference source module includes a reference objective lens, a mirror, and a piezoelectric actuator. The reference objective lens can focus the illumination beam on the mirror. The mirror is connected to the piezoelectric actuator. Therefore, when the piezoelectric actuator is actuated, a scanning reference beam is produced from the illumination beam.

The pickup module includes a pickup objective lens and a dual-axis linear stage. When the illumination beam illuminates the sample, the pickup objective lens is adapted to adjust the focal point of the image of the sample, so as to focus the illumination beam on a very small point on the sample to produce an image beam. The dual-axis linear stage is adapted to laterally move the sample. The image beam passing through the beam splitter and the reference beam together provide an interference image beam, which is filtered by the optical filter to remove undesired frequencies before entering the sensor module. The optical filter is an optical element. Different optical filters can be provided according to user's requirements. Or, interference image beams of different bandwidths can be selected depending on the characteristics of the sample.

The sensor module includes at least one photosensor for converting the interference image beam into a coherence confocal image electric signal for transmitting outward. After the pickup module has picked up the images of the sample laterally and in depth, the coherence confocal image electric signals can provide a 3D microscopic image of the sample.

In brief, the 3D OCT confocal imaging apparatus according to the present invention has one or more of the following advantages:

(1) It is able to satisfy the demands for high resolution by combining coherence tomography imaging and confocal microscopy imaging while using the same one light source. With an image processing system, a 3D OCT confocal microscopic image of the sample can be produced from these image electric signals. Furthermore, 3D OCT and confocal images can be spatially overlapped in one 3D image by means of gray and color codes in one time.

(2) With the present invention, it is possible to obtain a sample's microscopic images and generate synchronized coherence confocal image electric signal for transmitting outward to an external image processing computer to produce a real-time 3D image of the sample. Therefore, the present invention is more convenient for use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

According to a confocal microscope, a pinhole is provided on the optical path of the sample and lateral scanning is used, so that a three-dimensional contour of the sample can be detected using the confocal light intensity signal. The main principle of the confocal microscope is that, when a light ray from a point light source illuminates the sample and the sample is located at the focal plane, the catoptrical light ray is allowed to pass through the pinhole to the photosensor; and, in the case the sample is not located at the focal plane, the catoptrical light ray is blocked by the pinhole from passing therethrough. From the information detected by the photosensor and the scan positions of the sample in X, Y and Z directions, it is able to reconstruct the 3D image of the sample.

Figure 4:
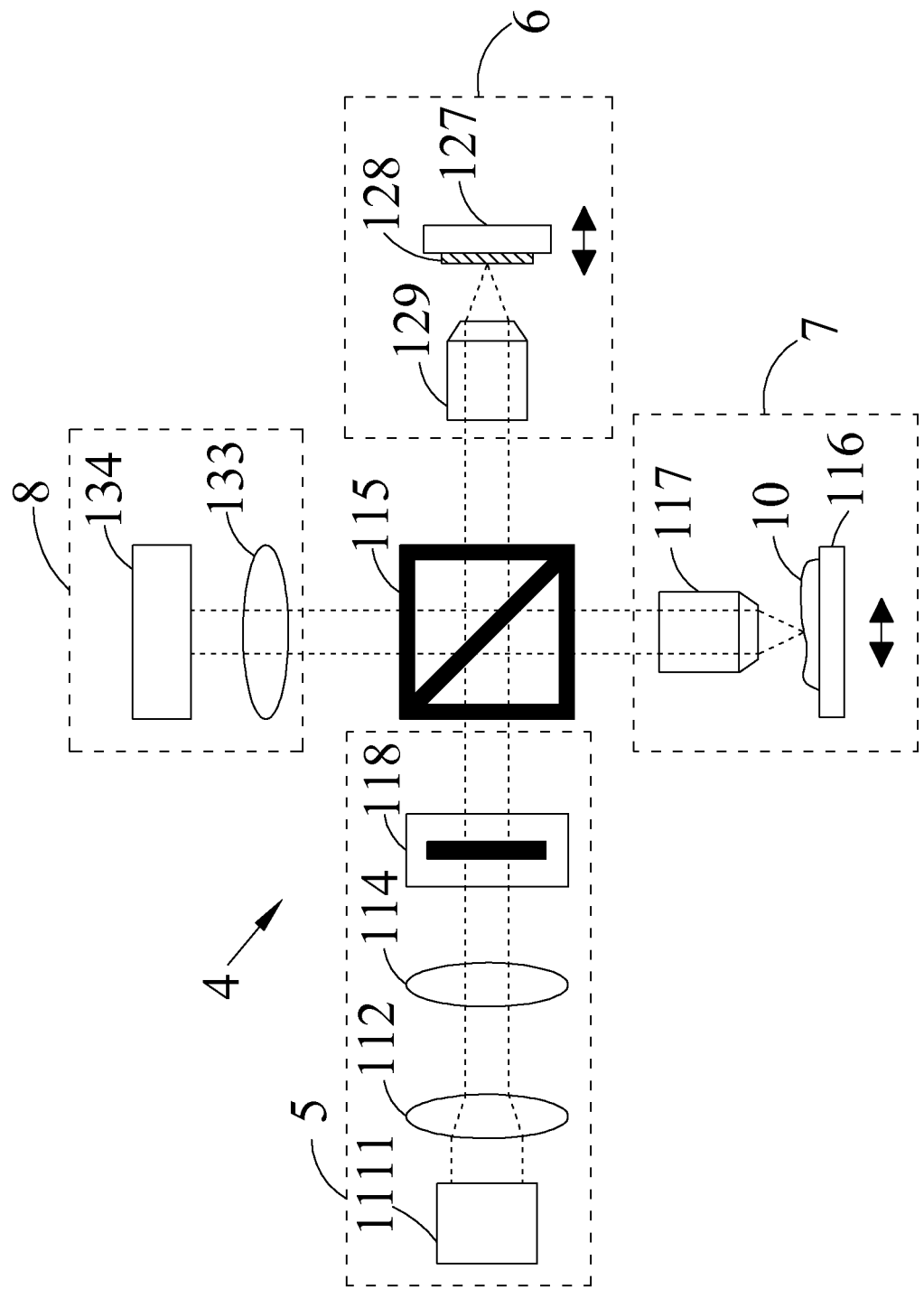
FIG. 4 is a schematic diagram of an OCT imaging apparatus.
Figure 5:
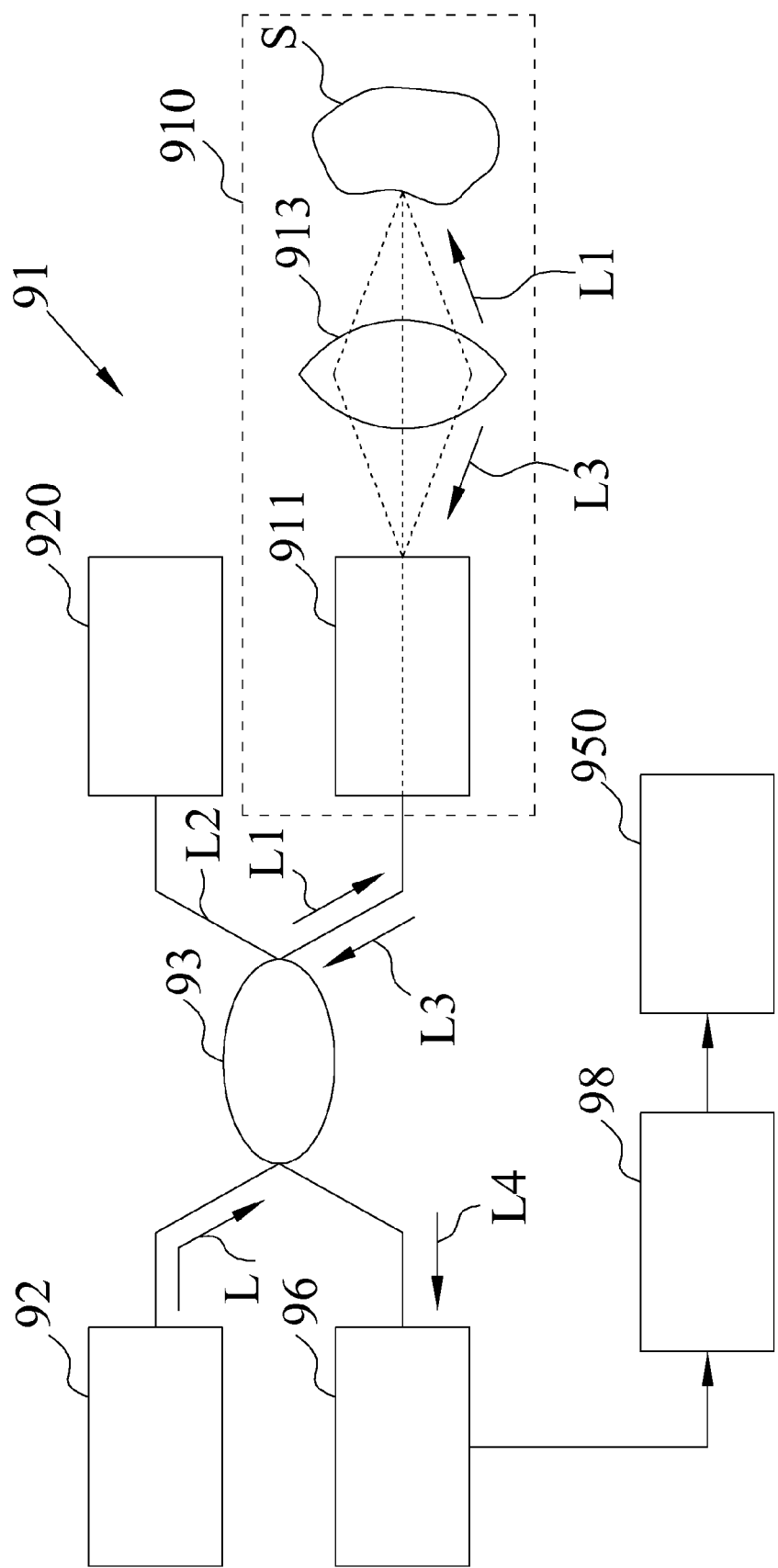
FIG. 5 is a schematic diagram of a conventional confocal microscope system.

The main principle of the OCT is that, when short-time coherence interference rises between the light beam reflected from the sample and the reference beam, the detected interference signal can undergo image processing and be converted into the depth-sectioning image of the sample. Along the optical path of the reference beam, there are arranged a focusing lens, a mirror, and a piezoelectric actuator (PZT). The PZT is used as an optical delay line. Depending on different applications of the reference beam or the light reflected from the sample, the PZT may be fixed to a dual-axis linear stage or another PZT is provided, in order to achieve the purpose of extending or shortening the distance of the reference beam. The dual-axis linear stage can be a translation stage driven by a step motor. FIG. 4 shows an OCT imaging apparatus 4 constructed according to the above-described principle. As shown, the OCT imaging apparatus 4 includes a light source module 5, a beam splitter 115, a reference source module 6, a pickup module 7, and a sensor module 8. The light source module 5 includes a broadband light source 1111, a focusing lens 112, a collimator 114, and an optical filter 118. The light source module 5 is adapted to emit broadband light, which passes through the focusing lens 112 and the collimator 114 to produce a collimated illumination beam. To match the spectrum of light needed to examine a sample 10, the pumping light in the beam is filtered by the optical filter 118. The filtered broadband illumination beam then passes and is refracted by the beam splitter 115 to illuminate the sample 10.

The pickup module 7 can include a pickup objective lens 117 and a dual-axis linear stage 116. The pickup objective lens 117 can be a high NA or a low NA objective lens. When the illumination beam enters the pickup module 7, the pickup objective lens 117 can focus the illumination beam on the sample 10. The dual-axis linear stage 116 serves to move the sample 10 in an X-Y plane of the sample 10, so that different positions on the sample 10 can be examined. An image of the sample 10 is reflected from the sample to pass through the pickup objective lens 117 and form an image beam, which is interfered by the reference beam produced by the beam splitter 115 and the reference source module 6 and then projects onto the sensor module 8. At the sensor module 8, the image beam is converted into an electric signal.

The reference source module 6 can include a piezoelectric actuator 127, a mirror 128, and a reference objective lens 129. The reference objective lens 129 is the same as the pickup objective lens 117, to symmetrically compensate the component dispersion. When the broadband illumination beam produced by the light source module 5 enters the reference source module 6, the reference objective lens 129 focuses the illumination beam on the mirror 128. The illumination beam is reflected from the mirror 128 to the beam splitter 115 to form the reference beam. The mirror 128 is coupled with the piezoelectric actuator 127. When the piezoelectric actuator 127 oscillates, the mirror 128 is brought to oscillate as the optical delay line at the same time. As a result, the reference beam reflected from the mirror 128 and the image beam produced by the pickup module 7 are synthesized to produce an interference image beam, which is in the form of a wave packet.

The sensor module 8 can include an objective lens 133 and a charge-coupled device (CCD) 134. The interference image beam formed from the reference beam and the image beam passes through the beam splitter 115 and the objective lens 133 to be focused on the CCD 134 to form an image thereon. The image is converted into an electric signal, which is transmitted to an image processor (not shown) for producing a microscopic image of the sample 10. When the dual-axis linear stage 116 moves the sample 10 to the whole X-Y plane, the obtained interference images of the sample 10 can be converted by the sensor module 8 into a tomographic image. Then, by adjusting the depth of the illumination beam via the high NA pickup objective lens 117, another tomographic image of the sample can be produced on the sensor module 8. Then, through the image processor (not shown), a 3D image of the sample 10 can be constructed from different tomographic images of the sample 10.

Figure 1:
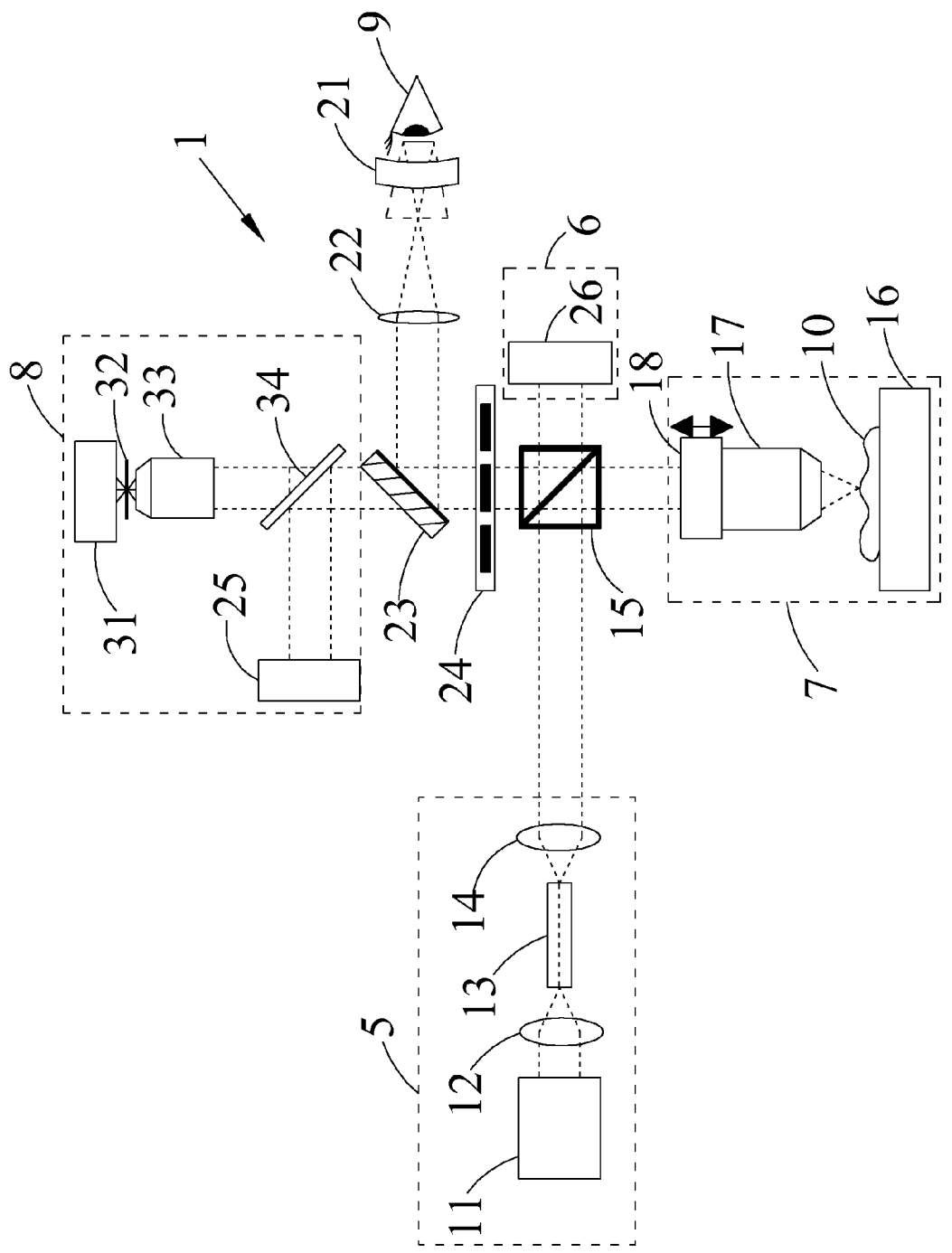
FIG. 1 is a schematic diagram of a 3D OCT confocal imaging apparatus according to a first embodiment of the present invention.

Please refer to FIG. 1, which is a schematic diagram of a 3D OCT confocal imaging apparatus 1 according to a first embodiment of the present invention. The 3D OCT confocal imaging apparatus 1 shown in FIG. 1 is used to produce the microscopic images of the sample 10 at different depths. Via an externally connected image processing computer (not shown), image electric signals converted from the microscopic images can be processed to form a three-dimensional visualized image of the sample 10. As shown in FIG. 1, the 3D OCT confocal imaging apparatus 1 includes a pumping source module 5, a reference source module 6, a pickup module 7, a beam splitter 15, an optical filter 24, and a sensor module 8.

The light source module 5 includes a pumping laser source 11, a focusing lens 12, a broadband gain medium 13, and a collimator 14. The pumping laser source 11 can be either a diode laser or a solid laser capable of emitting laser light when being excited, and the emitted laser light usually has a relatively narrow band width. In the illustrated first embodiment, the pumping laser source 11 is able to generate blue laser light that has a center wavelength of 446 nm and has a spectrum covering the wavelength of violet light. The broadband gain medium 13 converts the laser light into a broadband spontaneous emission light, which and the laser light together form an illumination beam with a relatively wider bandwidth. The illumination beam with wider bandwidth is the light ray of the light source to be used in OCT imaging. The broadband gain medium 13 can be implemented with different means, such as fluorescent powder, planar waveguide, crystal bulk and crystal fiber. In the illustrated first embodiment, the broadband gain medium 13 is implemented using a crystal fiber. However, it is understood the broadband gain medium 13 according to the present invention is not particularly restricted to the crystal fiber. The illumination beam produced by the broadband gain medium 13 enters the pickup module 7 and the reference source module 6 via the beam splitter 15.

The beam splitter 15 is an optical element capable of splitting light incident thereon into two parts, one of which is refracted into the pickup module 7 while the other part passes through the beam splitter 15 to the reference source module 6.

The reference source module 6 is changed into a power meter 26 to read the background power.

The pickup module 7 includes a pickup interference objective lens 17, a piezoelectric actuator 18, and a dual-axis linear stage 16. When the illumination beam illuminates the sample 10, the pickup interference objective lens 17 is able to adjust the focal point of the image of the sample 10, so that the illumination beam is focused on a very small point on the sample 10. The pickup interference objective lens 17 can be a Mirau objective lens. In the illustrated first embodiment, the pickup interference objective lens 17 is a high NA objective lens (over than 20×). With a high NA number, the pickup interference objective lens 17 is able to pick up very high resolution images of the sample 10. The piezoelectric actuator 18 is arranged on the pickup interference objective lens 17 to oscillate in the axial direction of the pickup interference objective lens 17 with longer travelling range, so as to produce oscillation in a depth direction relative to the sample 10. When the piezoelectric actuator 18 is actuated, it enables depth scan for obtaining microscopic images of the sample 10 and provides a scanning image beam. The piezoelectric actuator 18 and the pickup interference objective lens 17 together constitute an interference objective lens. The image beam passes through the beam splitter 15 and is interfered by the reference beam to provide an interference image beam. The interference can be low-coherence light interference. The interference image beam is filtered by the optical filter 24 to remove undesired frequencies therefrom before it enters the sensor module 8. The dual-axis linear stage 16 is able to dual-axially move the sample 10 laterally. When the dual-axis linear stage 16 moves the sample 10 to a next position, microscopy imaging can be correspondingly performed at the position.

The optical filter 24 is an optical element. Different optical filters can be provided depending on a user's requirements. Or, interference image beams of different bandwidths can be selected according to the characteristics of the sample 10. In the illustrated first embodiment, the optical filter 24 is in the form of a long strip, on which two long wavelength pass filters LWP1 and LWP2 each having a different bandwidth and one short wavelength pass filter (SWP) are arranged. It is able to switch among the LWP1, the LWP2 and the SWP via a moving mechanism (not shown), so as to allow only the long bandwidth interference image beam or only the short bandwidth interference image beam to pass through the optical filter 24. When the optical filter 24 is switched to the LWP1, fluorescence from the sample 10 and the wideband image beam are allowed to pass through the optical filter 24.

The sensor module 8 includes a photosensor 25, a dichroic mirror 34, an excited light photometer 31, a confocal objective lens 33, and a pinhole 32. When the interference image beam passes through the dichroic mirror 34, it is split by the dichroic mirror 34 into two parts of different bandwidths, which separately enter the photosensor 25 and the confocal objective lens 33. With the photosensor 25, the part of the split interference image beam entering thereinto is converted into a low coherence image electric signal for reflecting. In the illustrated first embodiment, the confocal objective lens 33 is a low NA objective lens, so that the split fluorescence light (or Raman-scattering light) passes through the confocal objective lens 33 and the pinhole 32 to form a confocal image. The confocal image formed from the fluorescent light (or Raman-scattering light) is converted by the excited light photometer 31 into a confocal image electric signal, which is then transmitted outward. Depending on different purposes, the excited light photometer 31 can be a fluorescence sensor, an avalanche photo diode (APD), a photomultiplier tube (PMT), or an optical spectrum analyzer (OSA) without being limited thereto. When the pumping laser source 11 emits blue laser light, part of the blue laser light is converted by the broadband gain medium 13 into a broadband light beam, which can be a light beam having the band of yellow light (ex: $Ce^{3+}$:YAG) or deep red light (ex: $Ti:Al_2O_3$). The remaining blue laser light and the converted broadband light beam together form the illumination beam. The blue light with short wavelength is able to bring some specific samples 10 to emit auto-fluorescence. In this case, the excited light photometer 31 in the form of a fluorescence sensor can be used to capture the auto-fluorescence or the Raman-scattering light to obtain a confocal image electric signal emitted by the sample 10.

In the case the excited fluorescence and the broadband light beam in the image beam reflected from the sample 10 do not overlap with each other, the dichroic mirror 34 will separate the excited fluorescence from the broadband light beam; and the conversion of the split interference image beam into the confocal image electric signal by the excited light photometer as a fluorescence sensor as well as the conversion of the other split interference image beam into the coherence image electric signal by the photosensor are performed synchronously.

On the other hand, in the case the fluorescence and the broadband light beam in the image beam reflected from the sample 10 overlap with each other, the coherence image and the confocal image of the fluorescence could not be retrieved synchronously. More specifically, the confocal image of the fluorescence can be captured by the excited light photometer 31 as a fluorescence sensor before the coherence image is captured by the photosensor 25. Alternatively, the coherence image can be captured by the photosensor 25 before the confocal image of the fluorescence can be captured by the excited light photometer 31 as a fluorescence sensor.

To observe the focusing condition of the sample 10, an observer 9 can insert a slit mirror 23 into the optical path. Being reflected by the slit mirror 23, the image beam passes through a tube lens 22 and an eye piece 21 and is observed by the observer 9.

The external image processing computer (not shown) serves to collect the coherence image electric signals and the confocal image electric signals generated by the photosensor 25 and the excited light photometer 31, respectively. With the above arrangements, when the pickup module 7 picks up the images of the sample 10 laterally and in depth, a 3D microscopic image of the sample 10 can be formed.

Figure 2:
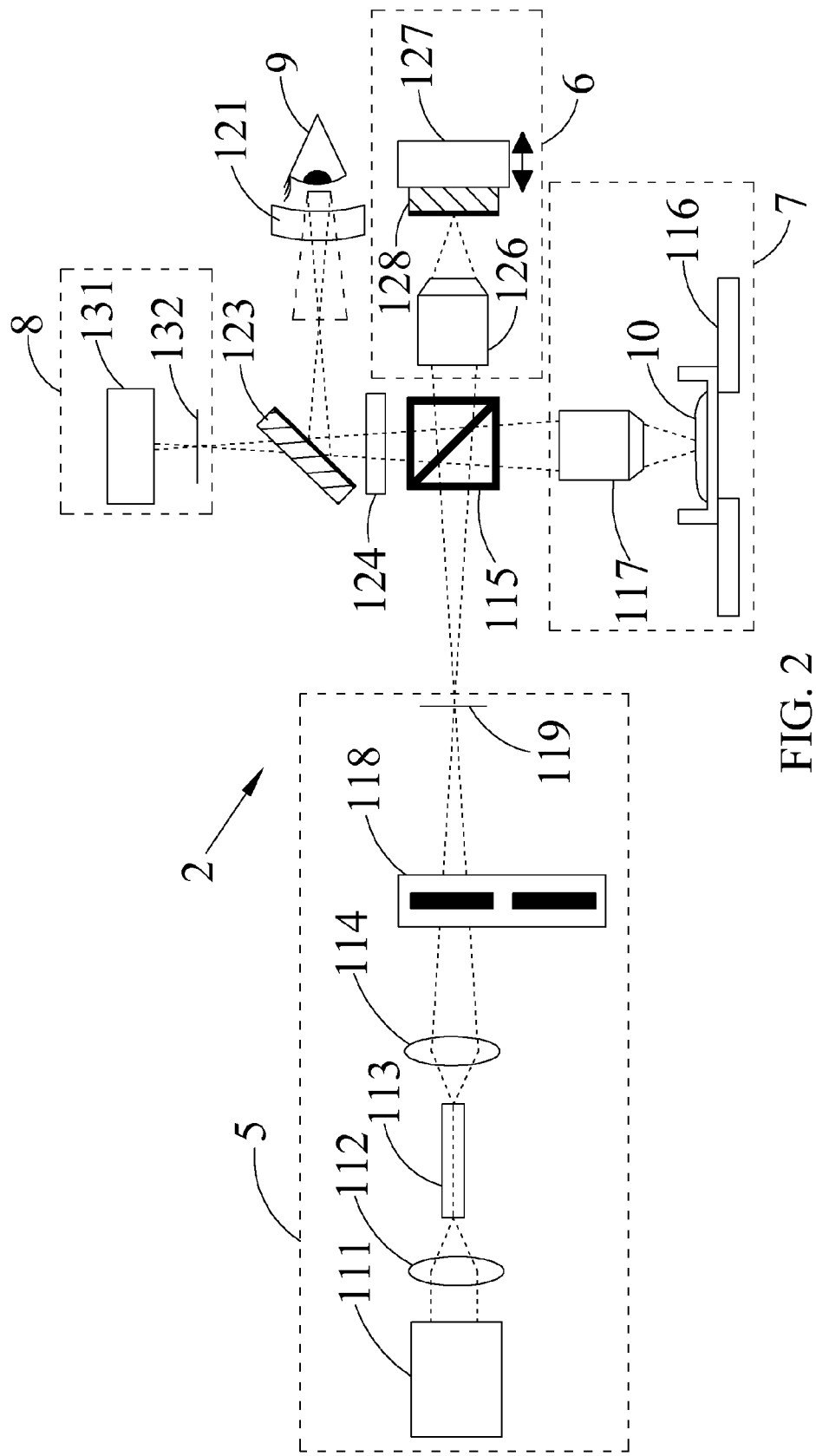
FIG. 2 is a schematic diagram of a 3D OCT confocal imaging apparatus according to a second embodiment of the present invention.

Please refer to FIG. 2 that is a schematic diagram of a 3D OCT confocal imaging apparatus 2 according to a second embodiment of the present invention. In the second embodiment, the 3D OCT confocal imaging apparatus 2 is a miniature 3D OCT confocal imaging apparatus, and includes a pumping source module 5, a reference source module 6, a pickup module 7, a beam splitter 115, an optical filter 124, and a sensor module 8.

The light source module 5 includes a pumping laser source 111, a focusing lens 112, a broadband gain medium 113, a collimator 114, an optical filter 118, and a pinhole 119. The pumping laser source 111 is adapted to emit laser light when being excited, and the emitted laser light usually has a relatively narrow bandwidth. The broadband gain medium 113 is adapted to convert the laser light into light rays of broadband spectrum, which and the laser light together form an illumination beam with a relatively wider bandwidth. In the illustrated second embodiment, the broadband gain medium 113 uses a wavelength converting element to convert the blue light emitted by the pumping laser source 111 into light with the waveband of red light without being limited thereto. The collimator 114 is adapted to collimate the illumination beam to produce a collimated illumination beam, which is filtered by the optical filter 118 and then passes through the pinhole 119 to produce a confocal illumination beam. The confocal illumination beam passes the beam splitter 115 to enter the pickup module 7 and the reference source module 6. The optical filter 118 can be a long wavelength pass filter LWP or a short wavelength pass filter SWP. In the illustrated second embodiment, the optical filter 118 is a two-piece filter having a long wavelength pass filter LWP and a short wavelength pass filter SWP. Depending on actual need in use, the optical filter 118 can be switched between the LWP and the SWP.

The reference source module 6 includes a reference objective lens 126, a mirror 128, and a piezoelectric actuator 127. The reference objective lens 126 can be a low NA objective lens for focusing the illumination beam on the minor 128. The minor 128 is disposed on the piezoelectric actuator 127. Therefore, when the piezoelectric actuator 127 is actuated, a scanning reference beam is produced from the illumination beam.

The pickup module 7 includes a pickup objective lens 117 and a dual-axis linear stage 116. When the illumination beam illuminates the sample 10, the pickup objective lens 117 is adapted to adjust the focal point of the image of the sample 10, so as to focus the illumination beam on a very small point on the sample to produce an image beam. In the illustrated second embodiment, the pickup objective lens 117 is a high NA objective lens capable of focusing the illumination beam on a very small point. The dual-axis linear stage 116 is adapted to laterally move the sample 10. The image beam passing through the beam splitter 115 and the reference beam together provide an interference image beam, which is filtered by the optical filter 124 to remove undesired frequencies therefrom before it enters the sensor module 8. The optical filter 124 is an optical element. Different optical filters can be provided according to user's requirements. Or, interference image beams of different bandwidths can be selected depending on the characteristics of the sample. In the illustrated second embodiment, the optical filter 124 is a long wavelength pass filter LWP.

To observe the focusing condition of the sample 10, an observer 9 can insert a slit mirror 123 into the optical path. Being reflected by the slit mirror 123, the image beam passes through an eye piece 121 and is observed by the observer 9.

The sensor module 8 includes a photosensor 131 and a pinhole 132. When the interference image beam passes through the pinhole 132, the photosensor 131 generates a coherence confocal image electric signal from light reflecting. Similarly, with the above arrangements, when the pickup module 7 has picked up the images of the sample 10 laterally and in depth, a 3D microscopic image of the sample 10 can be obtained from the correspondingly generated coherence confocal image electric signals.

Figure 3:
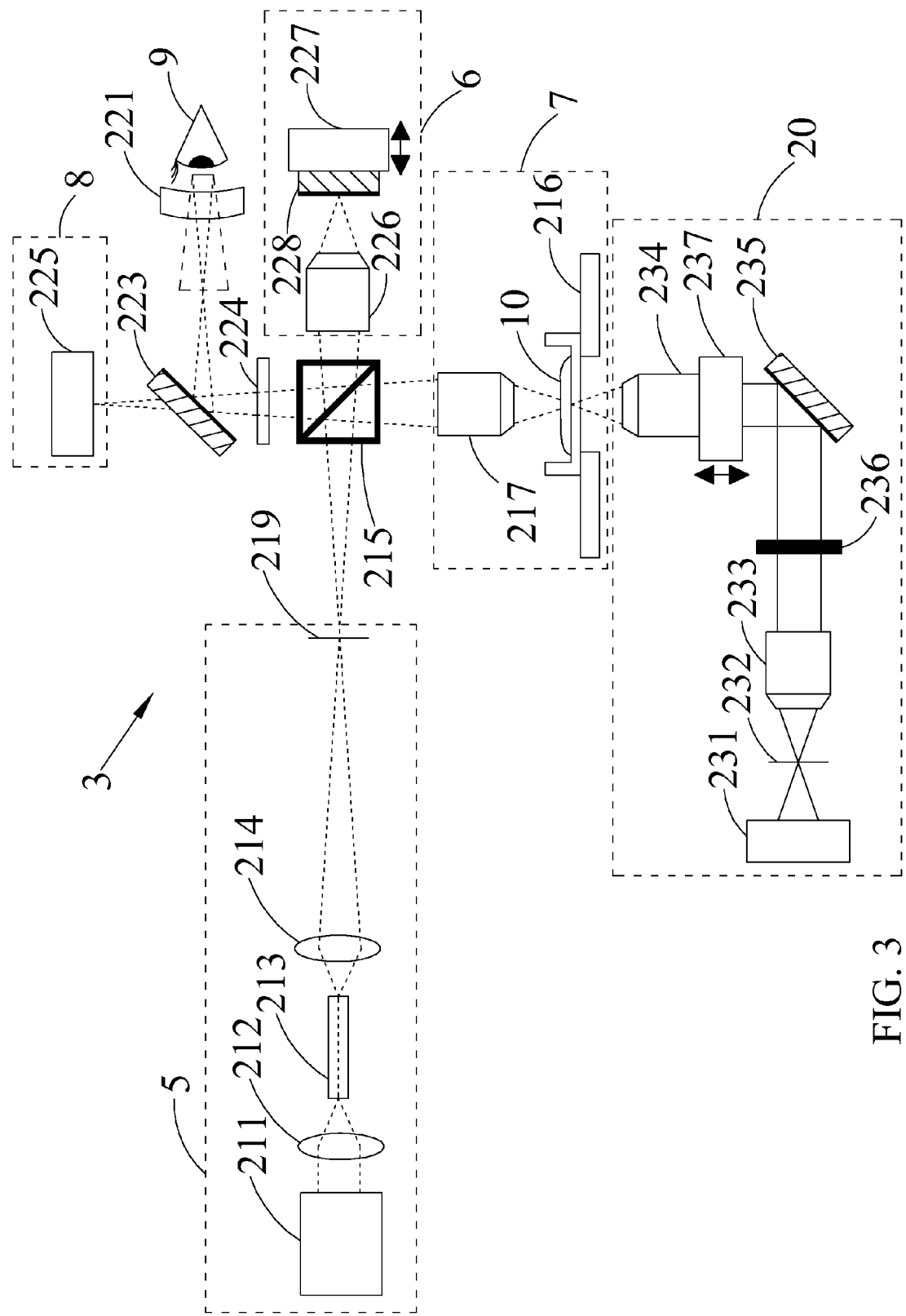
FIG. 3 is a schematic diagram of a 3D OCT confocal imaging apparatus according to a third embodiment of the present invention.

Please refer to FIG. 3 that is a schematic diagram of a 3D OCT confocal imaging apparatus 3 according to a third embodiment of the present invention. In the third embodiment, the 3D OCT confocal imaging apparatus 3 is a post-site 3D OCT confocal imaging apparatus 3. The third embodiment is similar to the second embodiment but further includes a coupled confocal fluorescence microscopic imaging module 20. The post-site 3D OCT confocal imaging apparatus 3 includes a light source module 5, a reference source module 6, a pickup module 7, a beam splitter 215, an optical filter 224, a sensor module 8, and a coupled confocal fluorescence microscopic imaging module 20.

The light source module 5 includes a pumping laser source 211, a focusing lens 212, a broadband gain medium 213, a collimator 214, and a pinhole 219. The third embodiment is different from the second embodiment in that the confocal illumination beam produced from the laser light emitted from the laser source 211 and passing through the pinhole 119 is not filtered to remove light rays with undesired wavelengths. The confocal illumination beam is directly projected into the beam splitter 215 and then enters the pickup module 7 and the reference source module 6.

The reference source module 6 includes a reference objective lens 226, a mirror 228, and a piezoelectric actuator 227. Since the reference source module 6 in the third embodiment is functionally the same as that in the second embodiment, it is not repeatedly described herein. The pickup module 7 includes a pickup objective lens 217 and a dual-axis linear stage 216. Since the pickup module 7 in the third embodiment is functionally the same as that in the second embodiment, it is not repeatedly described herein. The image beam passing through the beam splitter 215 and the reference beam together provide an interference image beam, which passes through the optical filter 224 to remove undesired frequencies therefrom before it enters the sensor module 8. The optical filter 224 is an optical element. Different optical filters can be provided according to user's requirements. Or, interference image beams of different bandwidths can be selected depending on the characteristics of the sample. In the illustrated third embodiment, the reference objective lens 226 is a low NA objective lens.

As in the second embodiment, to observe the focusing condition of the sample 10, an observer 9 can insert a slit mirror 223 into the optical path. Being reflected by the slit mirror 223, the image beam passes through an eye piece 221 and is observed by the observer 9.

The sensor module 8 includes a photosensor 225. The photosensor 225 is adapted to convert the interference image into a coherence image electric signal for transmitting outward. Similarly, with the above arrangements, when the pickup module 7 has picked up the images of the sample 10 laterally and in depth, a 3D microscopic image of the sample 10 can be formed from the correspondingly generated coherence image electric signals.

To observe the confocal fluorescence microscopic imaging, a coupled confocal fluorescence microscopic imaging module 20 can be arranged below the sample 10 at an opposite side of the pickup module 7 for generating a coupled confocal fluorescence image electric signal. The coupled confocal fluorescence microscopic imaging module 20 includes a second pickup objective lens 234, a second mirror 235, a second piezoelectric actuator 237, a band wavelength pass filter (BWP) 236, a second confocal objective lens 233, a second pinhole 232, and a fluorescence sensor 231. When the illumination beam illuminates the sample 10, the second pickup objective lens 234 adjusts the focal point of the image of the sample 10 below the sample 10, so as to produce a second image beam. Generally, the second pickup objective lens 234 is a high NA objective lens in order to push up the axial resolution of confocal image. In the illustrated third embodiment, the reference objective lens 226 is a low NA objective lens. The second piezoelectric actuator 237 is arranged on the second pickup objective lens 234. When the second piezoelectric actuator 237 is actuated, it causes the second image beam to scan. The band wavelength pass filter 236 is adapted to select the confocal fluorescence light, so that only the wavelength band of fluorescence is remained. The second image beam as fluorescence enters the second confocal objective lens 233 and the second pinhole 232 to produce a second confocal fluorescence image beam, which forms a bypassed confocal fluorescence image on the fluorescence sensor 231. And, the fluorescence sensor 231 converts the confocal fluorescence image into a confocal image electric signal for transmitting outward.

From tests conducted on different samples, it is found the 3D OCT confocal imaging apparatus according to the present invention at least a resolution in depth of 3.0 μm and a lateral resolution of 5.0 μm can be obtained when the sample is a semiconductor circuit; and at least a resolution in depth of 3.0 μm and a lateral resolution of 3.0 μm can be obtained through fluorescent OCT confocal imaging when the sample is a biological specimen.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A three-dimensional optical coherence tomography (3D OCT) confocal image apparatus for producing microscopic images of a sample at different depths thereof, comprising a light source module, a reference source module, a pickup module, a beam splitter, an optical filter, and a sensor module;

the light source module including a pumping laser source, a focusing lens, a broadband gain medium, a collimator, and a pinhole; the pumping laser source being adapted to emit laser light, the focusing lens being adapted to focus the laser light on the broadband gain medium; broadband gain medium being adapted to convert the focused laser light into light rays of different frequencies; the light rays with different frequencies and the laser light together forming an illumination beam, which is collimated by the collimator to provide a collimated illumination beam; the collimated illumination beam passing through the pinhole to produce a confocal illumination beam, which enters the beam splitter before entering the pickup module and the reference source module;

the reference source module including a reference objective lens, a minor and a piezoelectric actuator; the reference objective lens being adapted to focus the confocal illumination beam on the minor; the mirror being connected to the piezoelectric actuator; the piezoelectric actuator, when being actuated, being adapted to provide a scanning reference beam from the confocal illumination beam;

the pickup module including a pickup objective lens and a dual-axis linear stage; the pickup objective lens being adapted to adjust a focal point of an image of the sample to produce an image beam when the confocal illumination beam illuminates the sample disposed on a first side of the dual-axis linear stage; and the dual-axis linear stage being adapted to move the sample laterally; after passing the beam splitter, the image beam and the reference beam together producing an interference image beam; the interference image beam being filtered by the optical filter to remove undesired frequencies therefrom before entering the sensor module;

the sensor module including at least one photosensor for converting the interference image beam into a coherence confocal image electric signal for transmitting outward; and a coupled confocal fluorescence microscopic imaging module arranged at a second side of the dual-axis linear stage for generating a coupled confocal fluorescence image electric signal, wherein the first side of the dual-axis linear stage is opposite to the second side of the dual-axis linear stage;

whereby when the pickup module has picked up the images of the sample laterally and in depth, the correspondingly generated coherence confocal image electric signals can together produce a 3D microscopic image of the sample.

2. The 3D OCT confocal image apparatus as claimed in claim 1, wherein the light source module further includes an optical filter arranged between the collimator and the pinhole for filtering off light rays of undesired frequencies from the illumination beam; wherein the optical filter is selected from the group consisting of a long band wavelength pass filter, a short wavelength pass filter, and any combination thereof.

3. The 3D OCT confocal image apparatus as claimed in claim 1, wherein the sensor module further includes a pinhole for converting the interference image beam into a coherence confocal image, and the photosensor being adapted to convert the interference image beam into a coherence confocal image electric signal for transmitting outward.

4. The 3D OCT confocal image apparatus as claimed in claim 1, wherein the broadband gain medium comprises a crystal fiber.

5. The 3D OCT confocal image apparatus as claimed in claim 1, wherein the coupled confocal fluorescence microscopic imaging module including a second pickup objective lens, a second piezoelectric actuator, a band wavelength pass filter, a second confocal objective lens, a second pinhole, and a fluorescence sensor; the second pickup objective lens being adapted to adjust a focal point of the image of the sample when the illumination beam illuminates the sample, so as to produce a second image beam; the second piezoelectric actuator being arranged on the second pickup objective lens, such that when the second piezoelectric actuator is actuated, it causes the second image beam to scan; the band wavelength pass filter being adapted to select confocal fluorescence light, so that the filtered second image beam enters the second confocal objective lens and the second pinhole to produce a confocal fluorescence image on the fluorescence sensor; and the fluorescence sensor being adapted to convert the confocal fluorescence image into a confocal image electric signal for transmitting outward.

\* \* \* \* \*